(12) United States Patent
Whitworth

(10) Patent No.: US 8,710,690 B2
(45) Date of Patent: Apr. 29, 2014

(54) VERTICAL AXIS WIND TURBINES

(75) Inventor: Peter Fryer Whitworth, Stratford-upon-Avon (GB)

(73) Assignee: GE Energy Power Conversion Technology Limited, Rugby, Warwickshire (GB)

( * ) Notice: Subject to any disclaimer, the term of this patent is extended or adjusted under 35 U.S.C. 154(b) by 416 days.

(21) Appl. No.: 13/000,432

(22) PCT Filed: Jun. 22, 2009

(86) PCT No.: PCT/GB2009/001543
§ 371 (c)(1),
(2), (4) Date: Mar. 1, 2011

(87) PCT Pub. No.: WO2009/156712
PCT Pub. Date: Dec. 30, 2009

(65) Prior Publication Data
US 2011/0140452 A1      Jun. 16, 2011

(30) Foreign Application Priority Data

Jun. 26, 2008 (GB) .................................. 0811681.6

(51) Int. Cl.
*F03D 9/00* (2006.01)
*H02P 9/04* (2006.01)

(52) U.S. Cl.
USPC .............................................. 290/55; 290/44

(58) Field of Classification Search
USPC ...................................................... 290/44, 55
See application file for complete search history.

(56) References Cited

U.S. PATENT DOCUMENTS

| | | | |
|---|---|---|---|
| 6,285,090 B1 * | 9/2001 | Brutsaert et al. | 290/55 |
| 7,205,678 B2 * | 4/2007 | Casazza et al. | 290/55 |
| 7,385,305 B2 * | 6/2008 | Casazza et al. | 290/55 |
| 7,385,306 B2 * | 6/2008 | Casazza et al. | 290/55 |
| 7,528,497 B2 * | 5/2009 | Bertolotti | 290/55 |
| 7,635,937 B2 * | 12/2009 | Brunet et al. | 310/90.5 |
| 7,687,932 B2 * | 3/2010 | Casazza et al. | 290/55 |
| 7,891,941 B2 * | 2/2011 | Bevington et al. | 415/123 |
| 7,893,555 B2 * | 2/2011 | Casazza et al. | 290/55 |
| 8,319,362 B2 * | 11/2012 | Vihriala et al. | 290/44 |
| 8,384,233 B2 * | 2/2013 | Lagerweij et al. | 290/55 |
| 8,436,483 B2 * | 5/2013 | Perner et al. | 290/44 |
| 8,552,614 B2 * | 10/2013 | Altea et al. | 310/216.118 |
| 2006/0131985 A1 * | 6/2006 | Qu et al. | 310/266 |
| 2007/0164627 A1 * | 7/2007 | Brunet et al. | 310/90.5 |
| 2007/0222226 A1 * | 9/2007 | Casazza et al. | 290/55 |
| 2007/0222227 A1 * | 9/2007 | Casazza et al. | 290/55 |

(Continued)

FOREIGN PATENT DOCUMENTS

DE         36 38 129 A1      5/1988

*Primary Examiner* — Pedro J Cuevas
(74) *Attorney, Agent, or Firm* — Parks IP Law LLC; Theodore A. Wood

(57) ABSTRACT

The present invention relates to a vertical axis wind turbine having a vertical support tower. At least one aerofoil or blade is mounted for rotation about the support tower. An electrical machine, typically a permanent magnet generator includes a rotor assembly and a stator assembly. The at least one aerofoil is secured to the rotor assembly such that rotation of the aerofoil about the support tower causes rotation of the rotor assembly relative to the stator assembly. The stator assembly is formed as a structural component of the support tower and defines part of a vertical access passage that extends through the support tower to provide access for maintenance and repair.

10 Claims, 1 Drawing Sheet

(56) References Cited

U.S. PATENT DOCUMENTS

| | | | |
|---|---|---|---|
| 2007/0274838 A1* | 11/2007 | Bagepalli et al. | 416/245 R |
| 2008/0008575 A1 | 1/2008 | El-Sayed | 415/8 |
| 2008/0012346 A1* | 1/2008 | Bertolotti | 290/55 |
| 2008/0014088 A1* | 1/2008 | Rogall | 416/174 |
| 2008/0315594 A1* | 12/2008 | Casazza et al. | 290/55 |
| 2009/0107567 A1* | 4/2009 | Crary | 137/560 |
| 2009/0220342 A1* | 9/2009 | Wu et al. | 416/124 |
| 2010/0052325 A1* | 3/2010 | Perner et al. | 290/52 |
| 2010/0140955 A1* | 6/2010 | Casazza et al. | 290/55 |
| 2011/0109191 A1* | 5/2011 | Altea et al. | 310/216.118 |
| 2011/0121579 A1* | 5/2011 | Eriksen et al. | 290/55 |
| 2011/0123339 A1* | 5/2011 | Eriksen et al. | 416/169 R |
| 2011/0148116 A1* | 6/2011 | Halstead | 290/52 |
| 2011/0272950 A1* | 11/2011 | Stiesdal | 290/55 |
| 2012/0098270 A1* | 4/2012 | Song et al. | 290/55 |
| 2012/0126542 A1* | 5/2012 | Deng | 290/55 |
| 2012/0181792 A1* | 7/2012 | Pettersen et al. | 290/55 |
| 2013/0020807 A1* | 1/2013 | Thomsen | 290/55 |
| 2013/0214628 A1* | 8/2013 | Le Flem et al. | 310/90 |
| 2013/0292948 A1* | 11/2013 | Pallotti et al. | 290/55 |

* cited by examiner

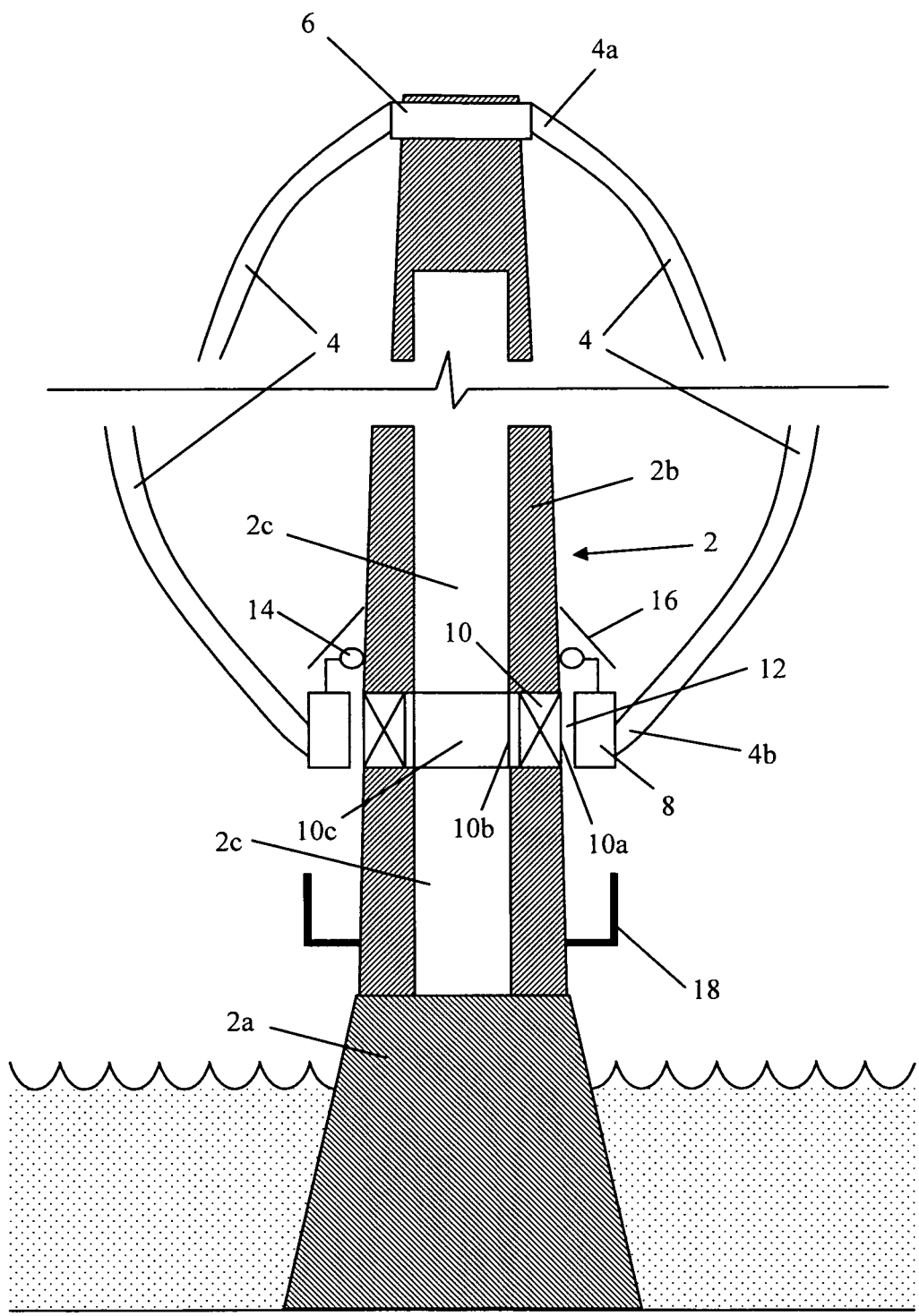

VERTICAL AXIS WIND TURBINES

CROSS REFERENCE TO RELATED APPLICATION

This application is a U.S. National Stage of PCT/GB2009/001543 which claims priority to GB Patent Application No. 0811681.6 filed Jun. 26, 2008.

TECHNICAL FIELD

The present invention relates to vertical axis wind turbines for generating electrical energy.

BACKGROUND ART

Vertical axis wind turbines are well known and include one or more aerofoils or blades that are mounted for rotation about a vertical axis. Rotation of the aerofoils by the wind causes the rotor of an electrical machine to rotate and generate electrical energy.

SUMMARY OF THE INVENTION

The present invention provides an alternative arrangement for a vertical axis wind turbine that offers technical advantages over existing wind turbines, including those where the turbine blades rotate about a horizontal axis and the electrical machine is mounted on the top of a vertical support tower.

More particularly, the present invention provides a vertical axis wind turbine comprising a support tower, at least one aerofoil mounted for rotation about the support tower, and an electrical machine including a rotor assembly and a stator assembly, wherein the rotor assembly is located radially outside the stator assembly and the at least one aerofoil is secured to the rotor assembly such that rotation of the aerofoil about the support tower causes rotation of the rotor assembly relative to the stator assembly.

The present invention provides certain benefits over existing wind turbines because the electrical machine is preferably located at a lower part of the support tower. The mass of the electrical machine is therefore transferred to the lower part of the support tower. This provides more stability because the centre of gravity of the support tower is lower and enables the construction of the support tower itself to be simplified.

Locating the electrical machine at a lower part of the support tower provides easier access for maintenance and repair, which is particularly important for offshore wind turbines. The power connections for transferring the electrical energy generated by the operation of the electrical machine to a supply network or power grid, power converters, filters etc., are also more easily accessible. An access platform may be provided around the support tower in the general vicinity of the electrical machine.

The particular arrangement of the rotor assembly and the stator assembly of the present invention provides further benefits. It has been noted that the outer diameter of the stator assembly for certain types of electrical machines of appropriate rating (in particular permanent magnet generators) may approximate to the outer diameter of the support tower. The stator assembly may therefore be formed as a structural component of the support tower. In other words, the stator assembly may be physically incorporated into the structural fabric of the support tower and optionally have a load-bearing capacity.

The stator assembly may define part of an access passage through the support tower.

In a particularly preferred aspect of the present invention, the stator assembly is formed as a generally cylindrical structure that is physically incorporated into the structural fabric of the support tower and which has an interior space through which access can be provided to upper parts of the support tower and/or to the component parts of the stator assembly itself. The interior space may be aligned with a general access passage that extends through the support tower and may form part of it.

An upper end of the at least one aerofoil can be secured to a collar or other suitable structure that is mounted for rotation about the support tower. The collar is preferably located at an upper part of the support tower.

The rotor assembly and the stator assembly are preferably spaced apart by a radial air gap and means (e.g. a roller bearing or spacer) can be provided for maintaining the radial air gap during rotation of the rotor assembly relative to the stator assembly. The means for maintaining the radial air gap and the rotor assembly may be shielded from the weather by a suitable cover.

The electrical machine can be a permanent magnet generator where the rotor assembly has a plurality of permanent magnets (typically located on its radially inner surface) and the stator assembly includes a plurality of stator windings. However, it will be readily appreciated that other types of electrical machine can be used depending on the particular requirements.

DRAWINGS

FIG. 1 is a cross-section view of an offshore wind turbine according to the present invention.

With reference to FIG. 1, an offshore vertical axis wind turbine includes a vertical support tower 2 having a base part 2a that is secured to the sea bed, typically by foundations (not shown) that extend a certain depth into the sea bed.

A pair of aerofoils 4 are mounted for rotation about the support tower 2. It will be readily appreciated that any convenient number of aerofoils may be used depending on the circumstances. Each aerofoil 4 includes an upper end 4a that is secured to a collar 6 and a lower end 4b that is secured to a rotor assembly 8. The collar 6 is mounted for relative rotation about the support tower 2 by any suitable means such as a radial bearing, for example.

The rotor assembly 8 includes a plurality of permanent magnets (not shown) on its radially inner surface. The rotor assembly 8 is located radially outside a stator assembly 10 that includes a plurality of stator windings (not shown). The radially outer surface 10a of the stator assembly is spaced apart from the rotor assembly 8 by a small radial air gap 12 that is shown exaggerated in FIG. 1 for improved clarity.

The air gap 12 is maintained by a roller bearing structure 14 that is mounted on the rotor assembly 8 and which cooperates with an annular bearing surface (not shown) on the outer surface of the support tower 2. The rotor assembly 8 is therefore mounted for rotation about the support tower 2 relative to the stator assembly 10. Alternative ways of maintaining the air gap can be used.

The rotor assembly 8 and roller bearing structure 14 are shielded from the weather by an angled cover 16 that is secured to the outer surface of the support tower 2.

An access platform 18 is provided around the lower part of the support tower 2 to enable easy access to the rotor assembly 8 for maintenance and repair.

The stator assembly 10 is physically integrated into the wall 2b of the support tower 2 and is a structural and load-bearing component of the support tower. This is achievable in practice because the outer diameter 10*a* of the stator assembly 10 can be made to be the same as, or very close to, the outer diameter of the support tower 2 at the particular axial location. The stator assembly 10 has an inner cylindrical surface 10*b* that defines an interior space 10*c*.

A general access passage 2*c* runs vertically through the support tower 2 and the interior space 10*c* of the stator assembly 10 is aligned with this access passage and forms part of it. The access passage enables a workman or engineer to reach the upper parts of the support tower 2 by means of an internal structure (not shown) such as ladders and platforms, for example. The access passage may also enable materials and equipment to be raised through the support tower 2 using a winch or lift (not shown). A workman or engineer using the general access passage 2*c* to climb up the inside of the support tower will therefore pass through the interior space 10*c* of the stator assembly 10. This may assist with repair or maintenance of the stator assembly 10 since access to the various component parts of the stator assembly may be provided from the interior space 10*c* through suitable panels or openings in the inner cylindrical surface 10*b*, for example.

Although in FIG. 1 the inner cylindrical surface 10*b* that defines the interior space 10*c* is shown to have the same diameter as the rest of the general access passage 2*c*, it will be readily appreciated that in some cases more limited access might be provided through the stator assembly 10. In other words, the means for providing access through the stator assembly 10 might be narrower than the rest of the general access passage 2*c* depending on the size and configuration of the stator assembly.

The general access passage 2*c* may also end at, or just above, the stator assembly 10 if its main function is simply to provide access to the interior space 10*c* for the repair or maintenance of the stator assembly.

One or more entry ways (not shown) may be provided through the wall 2*b* of the support tower to enable a workman or engineer to reach the general access passage 2*c* and the access platform 18.

Unlike in conventional wind turbines, all the various power converter and control circuits (not shown) associated with the stator assembly 10, and the power connections for transferring the electrical energy provided by the permanent magnet generator to a supply network or power grid, are located at the lower part of the support tower 2 and are therefore easily accessible.

The support tower 2 must have sufficient strength and rigidity to support the dynamic rotating components (i.e. the aerofoils, collar, rotor assembly and roller bearing structure) for all expected operating conditions. However, compared to existing wind turbines, the proposed structure is more stable, is mechanically simpler and therefore cheaper to construct, and has lower maintenance costs.

In use, the wind flowing past the wind turbine causes the aerofoils 4 to rotate about the support tower 2 (i.e. the aerofoils rotate about a vertical axis). The collar 6 and the rotor assembly 8 are secured to the ends of the aerofoils 4 and rotate with them. The rotation of the rotor assembly 8 relative to the stator assembly 10 results in the generation of electrical energy by the permanent magnet generator as is well known to the skilled person. The electrical energy will then be regulated by a power converter, filtered and provided to a supply network or power grid through power connections and an external transmission line.

The invention claimed is:

1. A vertical axis wind turbine comprising:
a support tower having an access passage therethrough;
at least one aerofoil mounted for rotation about the support tower; and
an electrical machine including a rotor assembly and a stator assembly;
wherein the rotor assembly is located radially outside the stator assembly, the at least one aerofoil being secured to the rotor assembly; and
wherein the stator assembly is physically integrated into a wall of the support tower, the physically integrated stator assembly forming a load-bearing component of the support tower.

2. A vertical axis wind turbine according to claim 1, wherein a lower end of the at least one aerofoil is secured to the rotor assembly.

3. A vertical axis wind turbine according to claim 1, wherein the rotor assembly and the stator assembly are located at a lower part of the support tower.

4. A vertical axis wind turbine according to claim 1, wherein an upper end of the at least one aerofoil is secured to a collar that is mounted for rotation about the support tower.

5. A vertical axis wind turbine according to claim 4, wherein the collar is located at an upper part of the support tower.

6. A vertical axis wind turbine according to claim 1, wherein the rotor assembly and the stator assembly are spaced apart by a radial air gap.

7. A vertical axis wind turbine according to claim 6, further comprising means for maintaining the radial air gap during rotation of the rotor assembly relative to the stator assembly.

8. A vertical axis wind turbine according to claim 1, wherein the rotor assembly is a permanent magnet rotor assembly and the stator assembly includes a plurality of stator windings.

9. A vertical axis wind turbine according to claim 1, wherein the stator assembly is formed as a generally cylindrical structure that is physically incorporated into the structural fabric of the support tower and which has an interior space through which access can be provided to upper parts of the support tower or to component parts of the stator assembly or both.

10. A vertical axis wind turbine according to claim 1, wherein an interior space is aligned with the access passage.

* * * * *